Aug. 31, 1948.  G. A. WALTERS  2,448,333
TROLLEY LINE CLAMP
Filed March 21, 1945  2 Sheets-Sheet 1
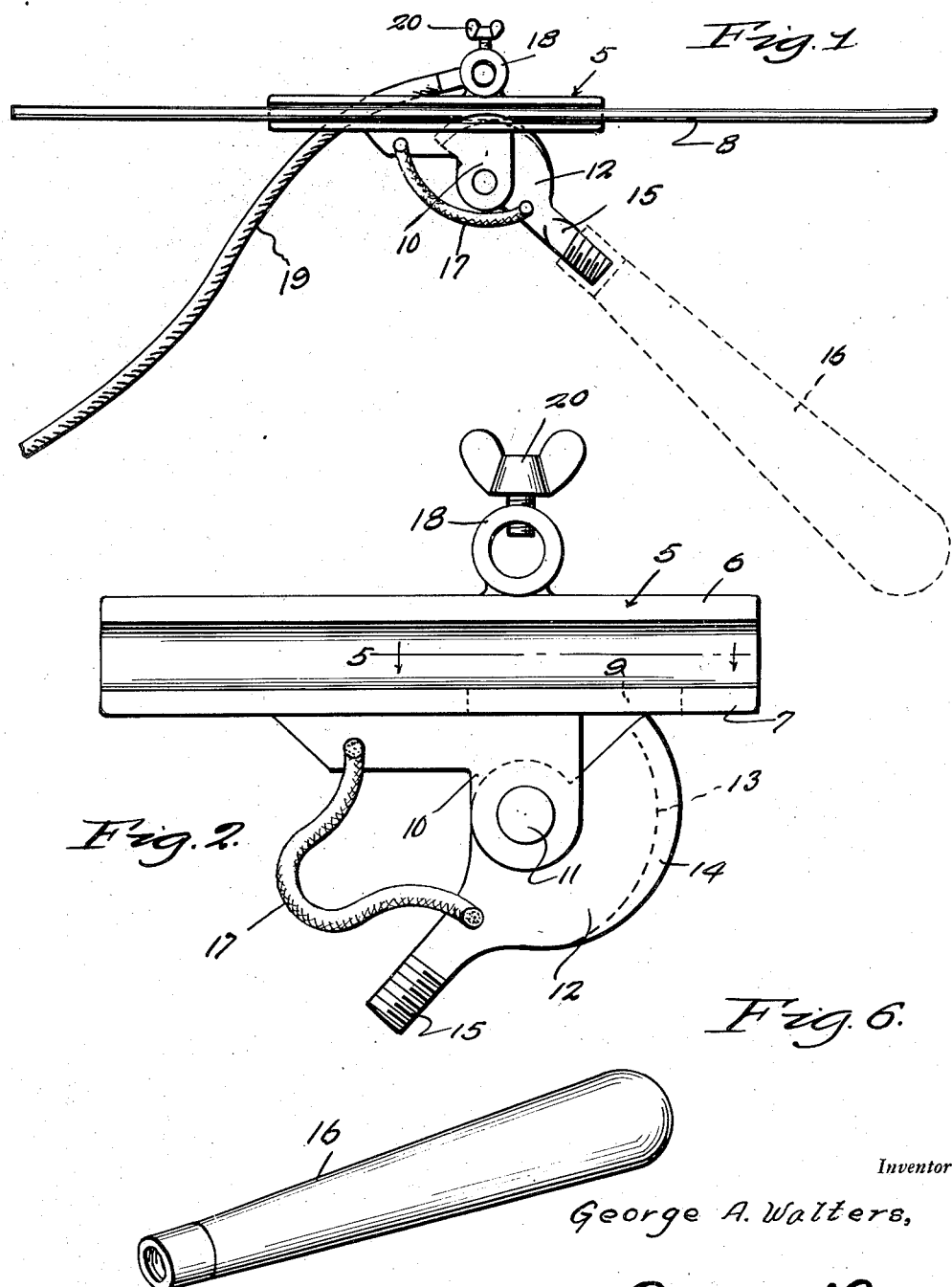
Inventor
George A. Walters,
By Clarence A. O'Brien
and Harvey B. Jacobson
Attorneys Aug. 31, 1948.　　　G. A. WALTERS　　　2,448,333
TROLLEY LINE CLAMP
Filed March 21, 1945　　　　　　　　　　　　　2 Sheets-Sheet 2
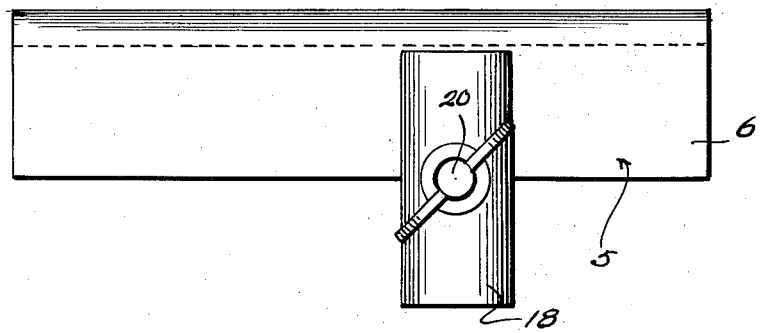
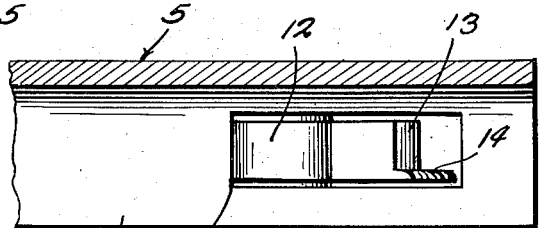
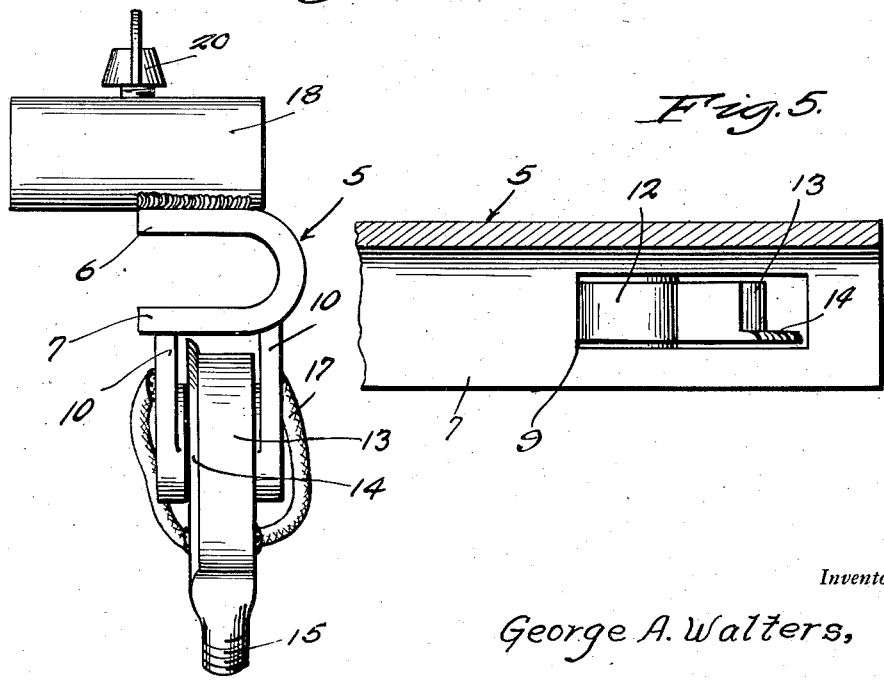
Inventor
George A. Walters,
By *Clarence A. O'Brien and Harvey B. Jackson*
Attorneys Patented Aug. 31, 1948

2,448,333

UNITED STATES PATENT OFFICE 2,448,333

TROLLEY LINE CLAMP

George A. Walters, Nemacolin, Pa.

Application March 21, 1945, Serial No. 583,900

2 Claims. (Cl. 173—273)

The present invention relates to a new and useful improvement in trolley line clamps of a type designed primarily for use in mines for connecting a trailing cable to mining machinery and invention has for its primary object to provide means for providing an effective connection between the trailing cable and the trolley line and eliminating the danger and damage caused to the equipment which results from a loose connection between the trailing cable and the trolley lines.

A further important object of invention is to provide a trolley line clamp of this character, which may be easily and quickly released for changing the position of the clamp on the trolley line, when desired.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is an enlarged side elevational view with the clamp removed from the trolley line.

Figure 3 is a top plan view.

Figure 4 is an end elevational view.

Figure 5 is a fragmentary sectional view taken substantially along the line 5—5 of Figure 2, and Figure 6 is a perspective view of the detachable handle.

Referring now to the drawings in detail wherein for the purpose of illustration I have disclosed a preferred embodiment of invention. The numeral 5 designates a U-shaped clamping member of elongated construction and including upper and lower flanges 6 and 7 between which the trolley line 8 is received for supporting the clamping member on the line.

The lower flange 7 is formed with a longitudinally extending slot 9 and the under side of the lower flange 7 is formed with a pair of downwardly extending spaced parallel, apertured ears 10 in which a pin 11 is journaled for pivotally supporting a cam 12 thereon, the cam including a cam edge 13 adapted for movement upwardly through the slot 9 into and out of clamping engagement with the under side of the trolley line 8 for clamping the line against the upper flanges 6.

The cam edge 13 is formed with a flange 14 at one side of the flange, the flange 14 being adapted to project upwardly along the outer edge of the trolley line 8 to prevent lateral slipping movement of the clamping member on the line.

The cam 12 is also formed on one edge with a threaded stem 15 to which a manipulating handle 16 may be threadedly connected, or the stem 15 may be utilized for attaching a fuse case (not shown) thereto, if desired.

A conductor wire 17 also connects one of the ears 10 with the cam 12 to prevent arcing at the pin 11 and also to prevent arcing upon contact of the cam with the trolley line.

A cylindrical clamp 18 is welded or otherwise suitably secured to the upper flange 6 of the clamping member 5, the clamping member 18 extending transversely of the clamping member 5 and in which one end of the trailing cable 19 is received and secured therein by the wing nut 20 whereby an electrical connection is provided between the trolley line 8 and the trailing cable 19.

From the foregoing it will be apparent that the clamp 5 may be secured in a desired position on the trolley line 8 by moving the cam 12 in a direction as shown in Figure 1 of the drawings to cause a frictional clamping engagement of the clamping member 5 with the trolley line, and the trolley line may be released from the clamping member 5 by moving the cam 12 into the position as shown in Figure 2.

It is believed that the details of construction and manner of use of the device will be readily understood from the foregoing without further detailed explanation.

I claim:

1. A trolley line clamp comprising an elongated channelled clamping member having upper and lower flanges adapted to receive the line therebetween, the lower flange having a longitudinal slot therein adapted to expose the line therethrough, a pair of laterally spaced ears depending from said lower flange upon opposite sides of said slot, and a cam member pivoted on said ears to rock between the same into and out of said slot to clampingly engage and release the line exposed through said slot respectively.

2. A trolley line clamp comprising an elongated channelled clamping member having upper and lower flanges adapted to receive the line therebetween, the lower flange having a longitudinal slot therein adapted to expose the line therethrough, a pair of laterally spaced ears depending from said lower flange upon opposite sides of said slot, and a cam member pivoted on said ears to rock between the same into and out of said slot to clampingly engage and release the line exposed through said slot respectively, said cam member having an edge flange thereon acting in conjunction with the back of the elongated clamping member to confine said line in said member.

GEORGE A. WALTERS.

REFERENCES CITED

The following references are of record in the file of this patent:

UNITED STATES PATENTS

| Number | Name | Date |
| --- | --- | --- |
| 448,847 | Leakin | Mar. 24, 1891 |
| 1,223,791 | Jackson | Apr. 24, 1917 |
| 1,496,603 | Rothenberger | June 3, 1924 |